(12) United States Patent
Gupta et al.

(10) Patent No.: US 12,685,942 B2
(45) Date of Patent: Jul. 21, 2026

(54) SYSTEMS AND METHODS FOR EXTERNALLY COMMUNICATING VEHICULAR GAMING STATUS

(71) Applicant: Toyota Motor Engineering & Manufacturing North America, Inc., Plano, TX (US)

(72) Inventors: Rohit Gupta, Santa Clara, CA (US); Benjamin Piya Austin, Saline, MI (US); Philip J. Babian, Canton, MI (US); Joshua E. Domeyer, Ypsilanti, MI (US); Marc D. Reish, Pinckney, MI (US); Takeshi Yoshida, Ann Arbor, MI (US); Rebecca L. Kirschweng, Bloomfield Hills, MI (US)

(73) Assignees: Toyota Motor Engineering & Manufacturing North America, Inc., Plano, TX (US); Toyota Jidosha Kabushiki Kaisha, Toyota Aichi-ken (JP)

( * ) Notice: Subject to any disclaimer, the term of this patent is extended or adjusted under 35 U.S.C. 154(b) by 202 days.

(21) Appl. No.: 18/647,090

(22) Filed: Apr. 26, 2024

(65) Prior Publication Data

US 2025/0332517 A1 Oct. 30, 2025

(51) Int. Cl.
*A63F 13/87* (2014.01)
*A63F 13/25* (2014.01)
(Continued)

(52) U.S. Cl.
CPC .............. *A63F 13/87* (2014.09); *A63F 13/25* (2014.09); *A63F 13/33* (2014.09); *A63F 13/798* (2014.09); *A63F 13/803* (2014.09)

(58) Field of Classification Search
CPC ................................. A63F 13/87; A63F 13/25
See application file for complete search history.

(56) References Cited

U.S. PATENT DOCUMENTS

| | | | | | |
|---|---|---|---|---|---|
| 4,564,905 A | * | 1/1986 | Masuda | .................. | G01F 9/008 |
| | | | | | 701/1 |
| 4,845,630 A | * | 7/1989 | Stephens | ................. | G01F 9/023 |
| | | | | | 701/123 |

(Continued)

FOREIGN PATENT DOCUMENTS

| | | |
|---|---|---|
| CN | 113253979 A | 8/2021 |
| CN | 116923093 A | 10/2023 |

*Primary Examiner* — Chase E Leichliter
(74) *Attorney, Agent, or Firm* — Christopher G Darrow; Darrow Mustafa, PC

(57) ABSTRACT

Systems and methods for externally communicating vehicular gaming status are disclosed herein. One embodiment of a gaming-status communication system detects automatically, in a connected vehicle, activation of a gaming mode of the connected vehicle in which a gaming system of the connected vehicle supports at least one of (1) electronic game playing by one or more occupants of the connected vehicle and (2) multi-vehicle networked electronic gaming involving the connected vehicle and one or more other connected vehicles. In response to detecting the activation of the gaming mode, the system activates automatically one or more external human-machine interface (HMI) indicators on the exterior of the connected vehicle to communicate, to other road users, information pertaining to the gaming mode of the connected vehicle.

20 Claims, 6 Drawing Sheets

(51) Int. Cl.
*A63F 13/33* (2014.01)
*A63F 13/798* (2014.01)
*A63F 13/803* (2014.01)

(56) References Cited

U.S. PATENT DOCUMENTS

| | | | | |
|---|---|---|---|---|
| 5,062,341 A * | 11/1991 | Reiling | G10H 1/42 | 84/738 |
| 5,557,683 A * | 9/1996 | Eubanks | H04R 5/02 | 84/625 |
| 6,289,332 B2 * | 9/2001 | Menig | B60K 35/26 | 340/439 |
| 6,300,870 B1 * | 10/2001 | Nelson | B60Q 1/544 | 340/471 |
| 7,537,522 B2 * | 5/2009 | Plavetich | A63F 13/00 | 463/36 |
| 7,603,228 B2 * | 10/2009 | Coughlin | B60W 40/09 | 345/157 |
| 7,659,808 B1 * | 2/2010 | Cooper | B60Q 1/50 | 340/471 |
| 7,663,047 B2 * | 2/2010 | Hanuschak | G10H 1/34 | 84/602 |
| 8,009,026 B2 * | 8/2011 | Giuli | H04L 67/131 | 340/459 |
| 8,160,813 B1 * | 4/2012 | McDermed | G09B 1/06 | 701/465 |
| 8,939,839 B2 * | 1/2015 | Cash | A63F 13/428 | 463/40 |
| 9,101,824 B2 * | 8/2015 | Cash | A63F 13/26 | |
| 9,263,775 B1 * | 2/2016 | Lowchareonkul | H01M 10/488 | |
| 9,902,266 B2 * | 2/2018 | Pisz | B60K 35/50 | |
| 10,059,347 B2 | 8/2018 | Thieberger-Navon et al. | | |
| 10,560,735 B2 | 2/2020 | Lin et al. | | |
| 10,573,102 B2 * | 2/2020 | Mito | G07C 5/0825 | |
| 10,625,676 B1 * | 4/2020 | Tsimhoni | G05D 1/0088 | |
| 10,841,632 B2 | 11/2020 | Chao et al. | | |
| 11,332,061 B2 | 5/2022 | Thieberger et al. | | |
| 11,554,669 B2 | 1/2023 | Veluppillai | | |
| 11,571,622 B2 * | 2/2023 | Mehdi | A63F 13/803 | |
| 2003/0227375 A1 * | 12/2003 | Yong | B60Q 1/549 | 340/425.5 |
| 2004/0097195 A1 * | 5/2004 | Selleck | G09G 3/04 | 455/73 |
| 2005/0220044 A1 * | 10/2005 | Choi | A63F 13/217 | 370/310 |
| 2005/0222716 A1 * | 10/2005 | Tengler | G01C 21/26 | 701/1 |
| 2006/0052167 A1 * | 3/2006 | Boddicker | B60N 3/005 | 463/37 |
| 2006/0148546 A1 * | 7/2006 | Inoue | A63F 13/803 | 463/6 |
| 2007/0088465 A1 * | 4/2007 | Heffington | G07C 5/085 | 701/1 |
| 2007/0149284 A1 * | 6/2007 | Plavetich | A63F 13/803 | 463/37 |
| 2007/0213884 A1 * | 9/2007 | Burnham | A63F 13/22 | 701/1 |
| 2007/0234888 A1 * | 10/2007 | Rotolo de Moraes | G10H 1/42 | 84/730 |
| 2007/0276582 A1 * | 11/2007 | Coughlin | B60W 50/16 | 701/123 |
| 2007/0293124 A1 * | 12/2007 | Smith | A63H 30/00 | 446/454 |
| 2008/0115654 A1 * | 5/2008 | Hanuschak | G10H 1/34 | 84/602 |
| 2008/0301556 A1 * | 12/2008 | Williams | G06T 13/40 | 715/706 |
| 2009/0081923 A1 * | 3/2009 | Dooley | A63F 9/143 | 463/6 |
| 2010/0176914 A1 * | 7/2010 | Moraes | B60K 35/232 | 340/3.1 |
| 2010/0214089 A1 * | 8/2010 | Giuli | H04L 67/12 | 340/459 |
| 2010/0333146 A1 * | 12/2010 | Pickney | H04N 21/41422 | 381/86 |
| 2011/0124389 A1 * | 5/2011 | Lee | B60K 35/10 | 463/9 |
| 2012/0038473 A1 * | 2/2012 | Fecher | H02J 7/005 | 340/455 |
| 2012/0075107 A1 * | 3/2012 | Newman | H01M 10/48 | 340/636.19 |
| 2012/0256751 A1 * | 10/2012 | Nallabelli | H02J 7/0048 | 340/636.1 |
| 2013/0083061 A1 * | 4/2013 | Mishra | A63F 13/803 | 345/633 |
| 2013/0145360 A1 * | 6/2013 | Ricci | G06F 13/14 | 717/174 |
| 2014/0128146 A1 * | 5/2014 | Story, Jr. | A63F 13/00 | 463/36 |
| 2014/0211962 A1 * | 7/2014 | Davis | B60W 50/14 | 381/86 |
| 2014/0292524 A1 * | 10/2014 | Nallabelli | H01M 10/4257 | 340/636.1 |
| 2015/0077272 A1 * | 3/2015 | Pisz | B60K 35/50 | 340/901 |
| 2015/0294656 A1 * | 10/2015 | Hanuschak | B60K 35/60 | 345/173 |
| 2016/0089994 A1 * | 3/2016 | Keller | B60L 53/14 | 320/153 |
| 2017/0054305 A1 * | 2/2017 | Kidakarn | H04M 1/00 | |
| 2017/0254858 A1 * | 9/2017 | Weicker | G01R 31/3648 | |
| 2018/0012197 A1 * | 1/2018 | Ricci | G06F 21/32 | |
| 2018/0017399 A1 * | 1/2018 | Rolnik | G01C 21/3469 | |
| 2018/0232195 A1 * | 8/2018 | Jaegal | G06F 3/04845 | |
| 2018/0278920 A1 | 9/2018 | Stefan | | |
| 2018/0293047 A1 * | 10/2018 | Suzuki | G10L 21/00 | |
| 2019/0079659 A1 * | 3/2019 | Adenwala | G08G 1/22 | |
| 2019/0220674 A1 * | 7/2019 | Khalfan | G06V 20/59 | |
| 2019/0260832 A1 * | 8/2019 | Tokuchi | H04L 41/046 | |
| 2019/0385379 A1 * | 12/2019 | Woo | G01C 21/3626 | |
| 2020/0042000 A1 * | 2/2020 | Jung | G05D 1/0061 | |
| 2020/0169107 A1 * | 5/2020 | Joshi | H01M 10/44 | |
| 2020/0197791 A1 * | 6/2020 | Iwasaki | A63F 13/213 | |
| 2020/0384885 A1 * | 12/2020 | Namiki | B60L 53/14 | |
| 2021/0023985 A1 * | 1/2021 | Stadnyk | B60Q 1/543 | |
| 2021/0053439 A1 * | 2/2021 | Kazuno | B60K 35/29 | |
| 2021/0069602 A1 * | 3/2021 | Namiki | A63F 13/822 | |
| 2021/0074048 A1 * | 3/2021 | Namiki | A63F 13/803 | |
| 2021/0074049 A1 * | 3/2021 | Namiki | G06Q 30/0207 | |
| 2021/0235242 A1 | 7/2021 | Shin | | |
| 2021/0276443 A1 * | 9/2021 | Namiki | B60L 53/62 | |
| 2022/0062752 A1 * | 3/2022 | Zeng | B60K 35/10 | |
| 2022/0108675 A1 * | 4/2022 | Brockwell | G10H 1/46 | |
| 2022/0179732 A1 | 6/2022 | Egger et al. | | |
| 2022/0303607 A1 * | 9/2022 | Gewickey | H04N 21/41422 | |
| 2022/0347567 A1 * | 11/2022 | Lake-Schaal | A63F 13/35 | |
| 2023/0264108 A1 * | 8/2023 | Wickman | A63F 13/65 | 463/40 |
| 2023/0321533 A1 * | 10/2023 | Varela | B60K 35/22 | |
| 2024/0321110 A1 * | 9/2024 | O'Donnell | G08G 1/22 | |
| 2025/0178436 A1 * | 6/2025 | Feng | B60K 35/23 | |
| 2025/0196635 A1 * | 6/2025 | Chen | B60K 35/22 | |
| 2025/0332517 A1 * | 10/2025 | Gupta | A63F 13/25 | |

* cited by examiner

330

Caution: Vehicle in Gaming Mode.

310

330

310

START

AUTOMATICALLY DETECT ACTIVATION OF
GAMING MODE IN CONNECTED VEHICLE — 610

AUTOMATICALLY ACTIVATE ONE OR MORE
EXTERNAL HMI INDICATORS TO COMMUNICATE,
TO OTHER ROAD USERS, INFORMATION
PERTAINING TO THE GAMING MODE OF THE
CONNECTED VEHICLE — 620

END

SYSTEMS AND METHODS FOR EXTERNALLY COMMUNICATING VEHICULAR GAMING STATUS

TECHNICAL FIELD

The subject matter described herein generally relates to vehicles and, more particularly, to systems and methods for externally communicating vehicular gaming status.

BACKGROUND

As automated and semi-automated vehicles become more widely accepted and used, interest in recreational activities in which vehicle occupants can engage to entertain themselves and pass the time increases. One example of such a recreational activity is electronic gaming, including multi-vehicle networked electronic gaming. However, vehicular gaming can impact other road users (other vehicles, bicyclists, motorcyclists, pedestrians, etc.). For example, a vehicle whose occupants are playing a game may behave in unexpected ways (e.g., pulling over and stopping frequently in connection with a scavenger hunt or geocaching activity). This unexpected behavior can pose a safety risk to the players in the vehicle and to the other road users. On the other hand, electronic gaming in automated and semi-automated vehicles creates opportunities for a variety of other-road-user-facing features that enhance the gaming experience for participants.

SUMMARY

An example of a system for externally communicating vehicular gaming status is presented herein. The system comprises a processor and a memory storing machine-readable instructions that, when executed by the processor, cause the processor to detect automatically, in a connected vehicle, activation of a gaming mode of the connected vehicle in which a gaming system of the connected vehicle supports at least one of (1) electronic game playing by one or more occupants of the connected vehicle and (2) multi-vehicle networked electronic gaming involving the connected vehicle and one or more other connected vehicles. The memory also stores machine-readable instructions that, when executed by the processor, cause the processor to activate automatically one or more external human-machine interface (HMI) indicators on an exterior of the connected vehicle to communicate, to other road users, information pertaining to the gaming mode of the connected vehicle.

Another embodiment is a non-transitory computer-readable medium for externally communicating vehicular gaming status and storing instructions that when executed by a processor cause the processor to detect automatically, in a connected vehicle, activation of a gaming mode of the connected vehicle in which a gaming system of the connected vehicle supports at least one of (1) electronic game playing by one or more occupants of the connected vehicle and (2) multi-vehicle networked electronic gaming involving the connected vehicle and one or more other connected vehicles. The instructions also cause the processor to activate automatically one or more external human-machine interface (HMI) indicators on an exterior of the connected vehicle to communicate, to other road users, information pertaining to the gaming mode of the connected vehicle.

In another embodiment, a method of externally communicating vehicular gaming status is disclosed. The method comprises detecting automatically, in a connected vehicle, activation of a gaming mode of the connected vehicle in which a gaming system of the connected vehicle supports at least one of (1) electronic game playing by one or more occupants of the connected vehicle and (2) multi-vehicle networked electronic gaming involving the connected vehicle and one or more other connected vehicles. The method also includes activating automatically one or more external human-machine interface (HMI) indicators on an exterior of the connected vehicle to communicate, to other road users, information pertaining to the gaming mode of the connected vehicle.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

To facilitate understanding, identical reference numerals have been used, wherever possible, to designate identical elements that are common to the figures. Additionally, elements of one or more embodiments may be advantageously adapted for utilization in other embodiments described herein.

DETAILED DESCRIPTION

Various embodiments of systems and methods for externally communicating vehicular gaming status described herein improve safety and facilitate vehicular gaming in new and advantageous ways.

In embodiments, an in-vehicle gaming-status communication system automatically detects the activation of the gaming mode of a connected vehicle. When the gaming mode is active, a gaming system in the connected vehicle supports at least one of (1) electronic game playing by one or more occupants of the connected vehicle and (2) multi-vehicle networked electronic gaming involving the connected vehicle and one or more other connected vehicles. For example, in some embodiments the occupants of a plurality of networked connected vehicles might participate together in an electronic-gaming activity such as a mystery tour or scavenger hunt.

In response to detecting activation of the gaming mode in the connected vehicle, gaming-status communication system automatically activates one or more external human-machine interface (HMI) indicators on the exterior of the connected vehicle to communicate, to other road users (ORUs), information pertaining to the gaming mode of the connected vehicle.

The external HMI indicators can be of a variety of different kinds and can serve a variety of different purposes, depending on the embodiment. Two categories of external HMI indicators are (1) those that improve roadway safety and (2) those that facilitate vehicular gaming for participants in various ways. Examples of both categories of external HMI indicators and the variety of ways in which the external HMI indicators can be implemented are discussed in detail below.

In some embodiments, the gaming-status communication system adjusts the settings of an Advanced Driver-Assistance System (ADAS) in the connected vehicle to enhance safety and, at the same time, improve the experience of electronic game playing for vehicle occupants.

Figure 1:
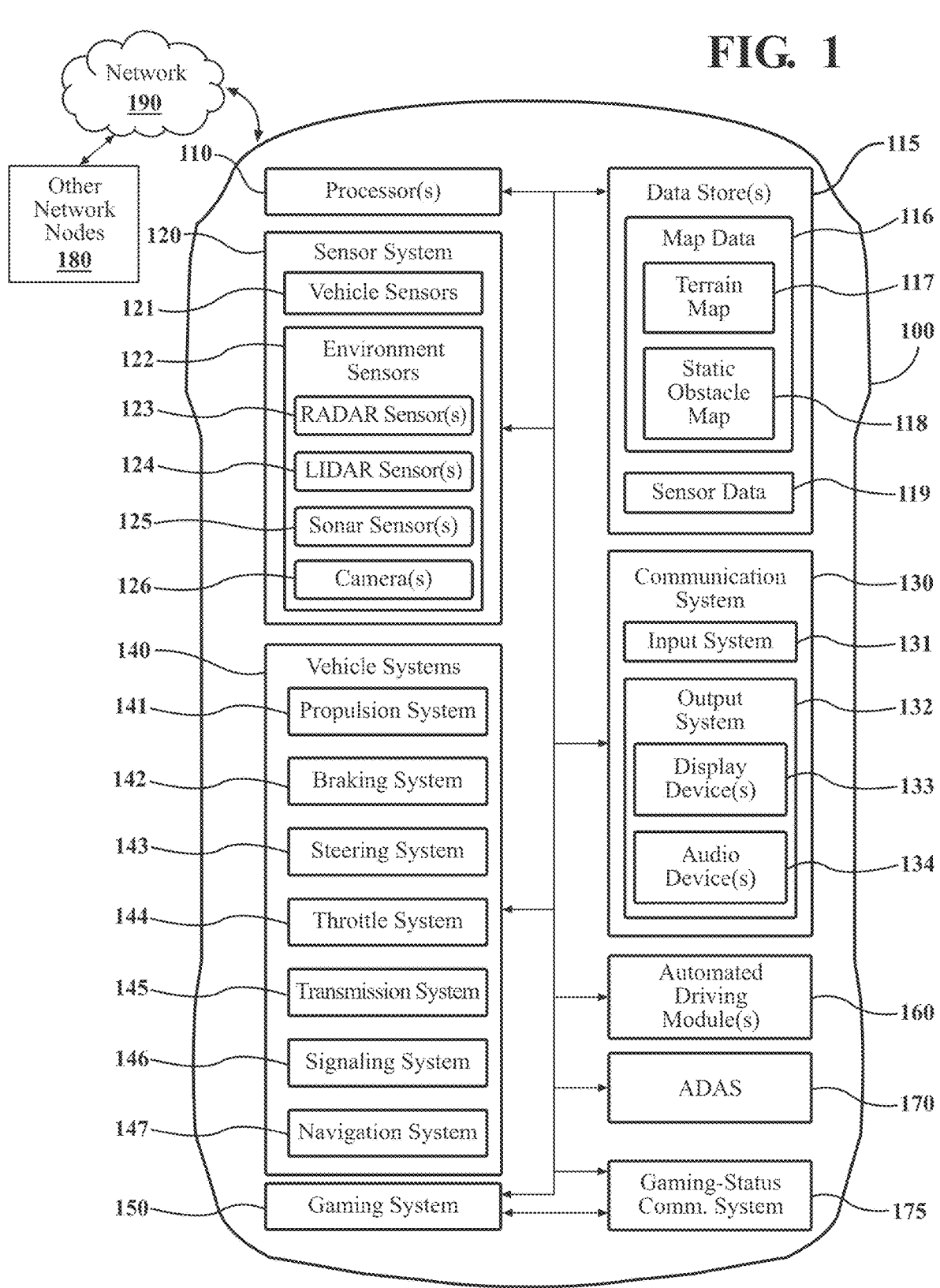
FIG. 1 illustrates a connected vehicle in which various embodiments of the systems and methods disclosed herein can be implemented.

Referring to FIG. 1, it depicts a connected vehicle 100 in which various embodiments of a gaming-status communication system can be implemented, as discussed in greater detail below. As used herein, a "vehicle" is any form of motorized transport. One example of a "vehicle," without limitation, is an automobile. Herein, a "connected vehicle" is a vehicle that communicates with other connected vehicles, cloud servers, infrastructure (e.g., roadside units, traffic signals), etc., via a network.

In embodiments, connected vehicle 100 includes an automated driving system that enables connected vehicle 100 to operate in a semi-automated or automated driving mode. For example, in some embodiments, connected vehicle 100 can operate at a high or total level of autonomy (e.g., Society of Automotive Engineers Autonomy Levels 3-5). In other embodiments, connected vehicle 100 can operate in a semi-automated driving mode by virtue of features such as adaptive cruise-control (ACC), automatic lane-change assistance, automatic lane-keeping, and automatic parking assistance. In still other embodiments, connected vehicle 100 can operate in a semi-automated driving mode via an intelligent driving assistance system such as an Advanced Driver-Assistance System (ADAS) 170. In some embodiments, features such as ACC are aspects of the ADAS 170. In some embodiments, the ADAS 170 can intervene (e.g., temporarily take control of acceleration/deceleration and/or steering) to avoid a collision or other accident. In still other embodiments, connected vehicle 100 may be driven manually by a human driver.

As indicated in FIG. 1, the connected vehicle 100 includes additional elements. It will be understood that, in various embodiments, it may not be necessary for the connected vehicle 100 to have all the elements shown in FIG. 1. The connected vehicle 100 can have any combination of the various elements shown in FIG. 1. Further, the connected vehicle 100 can have additional elements to those shown in FIG. 1. In some arrangements, the connected vehicle 100 may be implemented without one or more of the elements shown in FIG. 1, including gaming-status communication system 175. While the various elements are shown as being located within the connected vehicle 100 in FIG. 1, it will be understood that one or more of these elements can be located external to the connected vehicle 100. Further, the elements shown may be physically separated by large distances. Some of the possible elements of the connected vehicle 100 are shown in FIG. 1. However, a description of many of the elements in FIG. 1 will be provided after the discussion of FIGS. 2-6 for purposes of brevity of this description. As shown in FIG. 1 and as discussed above, connected vehicle 100 is equipped with an automated driving system that includes one or more automated driving module(s) 160 and/or an ADAS 170. A number of other elements (e.g., sensor system 120) support the automated driving system of connected vehicle 100, as explained further below.

As shown in FIG. 1, connected vehicle 100 includes an in-vehicle gaming system 150. As discussed above, this gaming system 150 supports electronic game playing by one or more occupants of connected vehicle 100, multi-vehicle networked electronic gaming involving the connected vehicle 100 and one or more other connected vehicles 100, or both, depending on the embodiment. For example, the gaming systems 150 of different connected vehicles 100 can communicate with one another to support multi-vehicle networked electronic gaming. Gaming system 150 can include a variety of components and features, depending on the embodiment. For example, gaming system 150 can include components such as wireless or wired game controllers, one or more displays (e.g., among the display device(s) 133 in connected vehicle 100), and virtual-reality (VR) headsets (not shown in FIG. 1).

As shown in FIG. 1, connected vehicle 100 can include a gaming-status communication system 175. Gaming-status communication system 175 communicates, to ORUs (other vehicles, bicyclists, motorcyclists, pedestrians, etc.), information pertaining to the gaming mode of the connected vehicle 100. Gaming-status communication system 175 communicates the gaming-related information via one or more external HMI indicators on the exterior of the connected vehicle 100. In some embodiments, gaming-related information pertaining to other connected vehicles 100 can also be provided via, e.g., a center-console display or other display within the passenger compartment of a connected vehicle 100. Embodiments employing various kinds of external HMI indicators in different ways are discussed in greater detail below.

As also shown in FIG. 1, connected vehicle 100 can communicate with other network nodes 180 (e.g., other connected vehicle, cloud servers, edge servers, roadside units, infrastructure devices, etc.) via a network 190. In some embodiments, network 190 includes the Internet. In communicating with the other network nodes 180, connected vehicle 100 can make use of wireless communication technologies such as cellular data, Bluetooth®, Bluetooth® Low Energy (LE), and Dedicated Short-Range Communications (DSRC). In some of the embodiments described herein, gaming system 150 communicates via network 190 with other connected vehicles 100 equipped with similar gaming systems 150 and gaming-status communication systems 175 to support multi-vehicle networked electronic gaming involving a particular connected vehicle 100 (the "ego vehicle") and one or more other connected vehicles 100.

Figure 2:
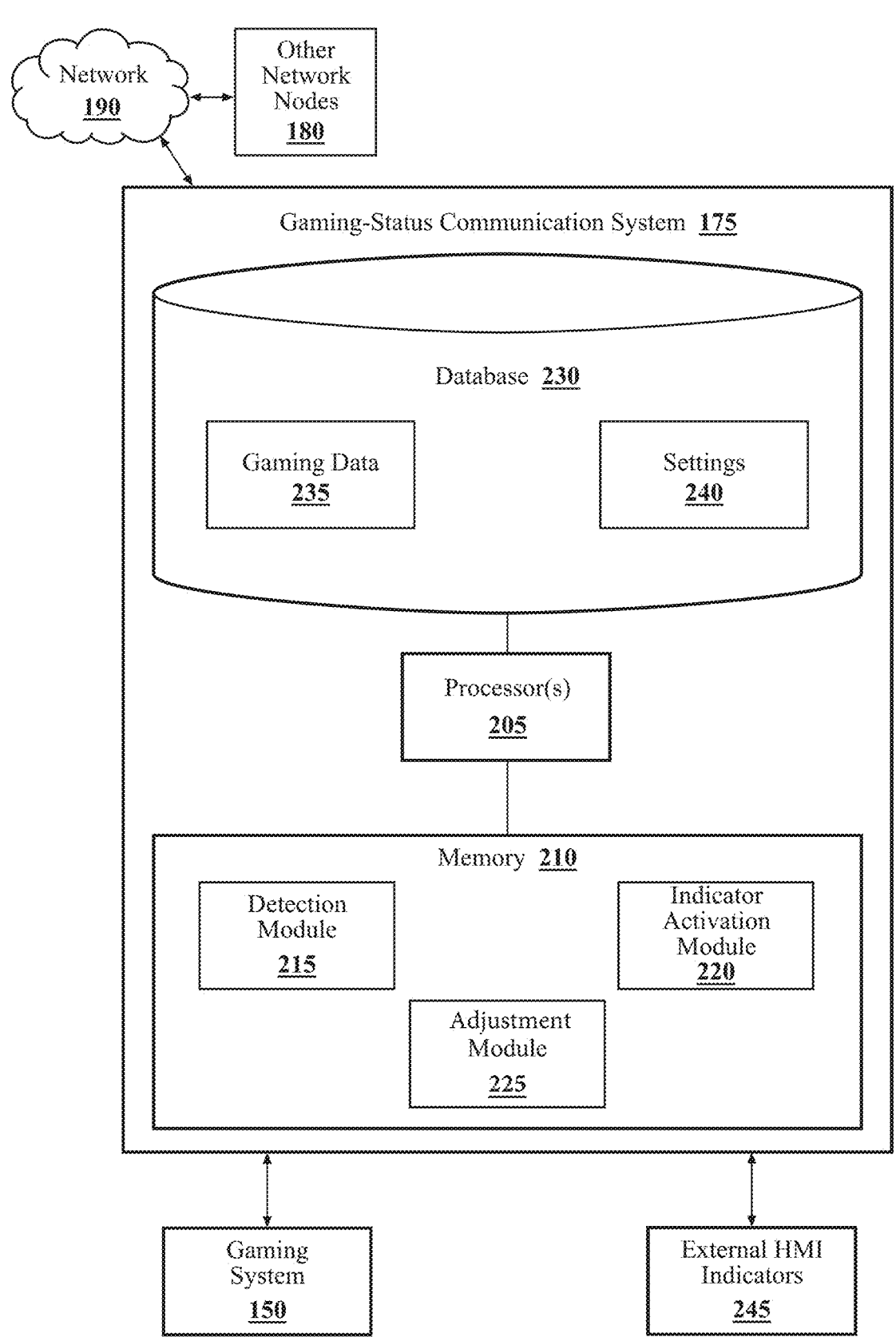
FIG. 2 is a block diagram of a gaming-status communication system, in accordance with an illustrative embodiment of the invention.

FIG. 2 is a block diagram of a gaming-status communication system 175, in accordance with an illustrative embodiment of the invention. In FIG. 2, gaming-status communication system 175 includes one or more processors 205 to which a memory 210 is communicably coupled. Memory 210 stores a detection module 215, an indicator activation module 220, and an adjustment module 225. The memory 210 is a random-access memory (RAM), read-only memory (ROM), a hard-disk drive, a flash memory, or other suitable non-transitory memory for storing the modules 215, 220, and 225. The modules 215, 220, and 225 are, for example, machine-readable instructions that, when executed by the one or more processors 205, cause the one or more processors 205 to perform the various functions disclosed herein.

As shown in FIG. 2, gaming-status communication system 175 interfaces with gaming system 150 and controls (i.e., activates, deactivates, and otherwise controls the operation of) one or more external HMI indicators 245. Examples of various kinds of external HMI indicators 245 are discussed below.

As also shown in FIG. 2, gaming-status communication system 175 can store various kinds of data in a database 230. For example, gaming-status communication system 175 can store gaming data 235 and settings 240.

Gaming data 235 includes a variety of different kinds of data that gaming-status communication system 175 receives from gaming system 150 regarding the status of gaming in an ego connected vehicle 100 and, in some embodiments, other connected vehicles 100. For example, gaming data 235 can include the identity of a game being played, the number of players in the connected vehicle 100 and/or other connected vehicles 100 who are currently playing a game, the identities of the players (vehicle occupants) playing the game, the standings (e.g., scores) of the players, the stage/level of the current game, and other relevant information. Gaming-status communication system 175 uses the gaming data 235 in determining which external HMI indicators 245 to activate and how to configure/adjust the external HMI indicators 245.

Settings 240 include various operational parameters and user preferences that govern the operation of gaming-status communication system 175.

As also shown in FIG. 2, gaming-status communication system 175 can communicate with other network nodes 180 (e.g., other connected vehicles, cloud servers, edge servers, roadside units, infrastructure devices, etc.) via a network 190, as discussed above.

Detection module 215 generally includes machine-readable instructions that, when executed by the one or more processors 205, cause the one or more processors 205 to detect automatically, in a connected vehicle 100, activation of a gaming mode of the connected vehicle 100 in which a gaming system 150 of the connected vehicle 100 supports at least one of (1) electronic game playing by one or more occupants of the connected vehicle 100 and (2) multi-vehicle networked electronic gaming involving the connected vehicle 100 and one or more other connected vehicles 100. In some embodiments, gaming-status communication system 175 receives a notification from gaming system 150 that gaming system 150 has been activated (i.e., that connected vehicle 100 has entered "gaming mode").

Indicator activation module 220 generally includes machine-readable instructions that, when executed by the one or more processors 205, cause the one or more processors 205 to activate automatically one or more external HMI indicators 245 on the exterior of the connected vehicle 100 to communicate, to ORUs, information pertaining to the gaming mode of the connected vehicle 100. As discussed above, two categories of external HMI indicators are (1) those that improve roadway safety and (2) those that facilitate vehicular gaming for participants in various ways. Examples of both categories of external HMI indicators 245 are discussed below, and some of those examples are illustrated and discussed in greater detail in connection with FIGS. 3A-5B.

The external HMI indicators 245 can be implemented in a variety of different ways, depending on the embodiment. In some embodiments, the external HMI indicators 245 include a display on the exterior of the connected vehicle 100. In some embodiments, the display (e.g., a flat-panel or curved display) is mounted on the exterior of connected vehicle 100. In other embodiments, the display is a transparent display (e.g., based on electrochromic-glass technology) implemented in a window (e.g., side window, rear widow, or windshield) of connected vehicle 100. Such a window-based transparent display displays information to ORUs in the environment external to connected vehicle 100 while simultaneously functioning as a transparent window for the occupants of the connected vehicle 100.

Figures 3A, 3B:
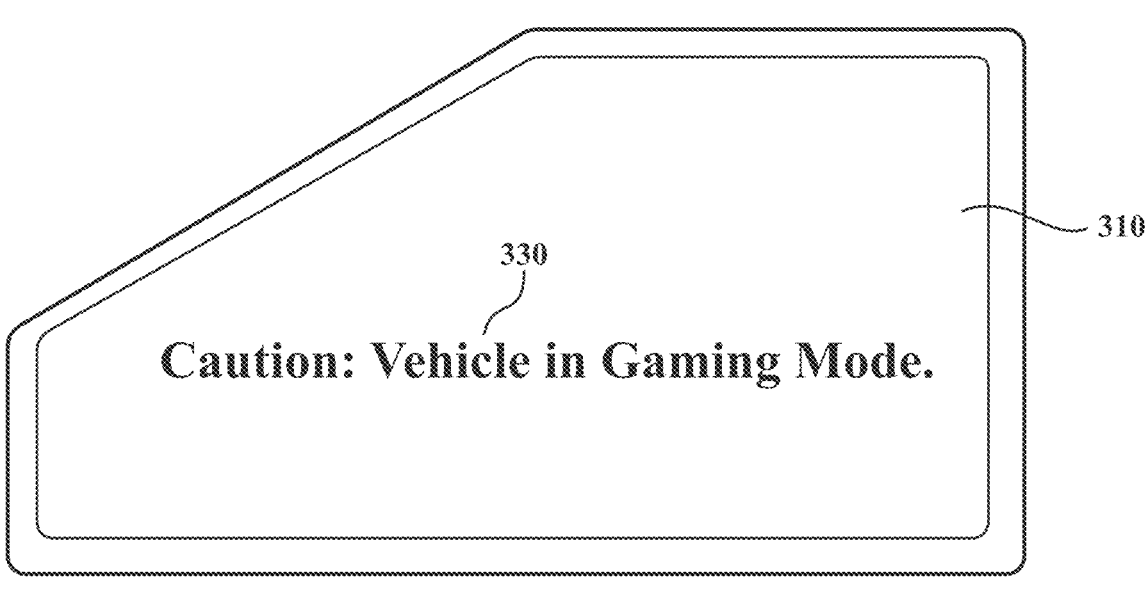
FIGS. 3A and 3B illustrate external human-machine interface (HMI) indicators informing other road users (ORUs) that a connected vehicle is in gaming mode, in accordance with illustrative embodiments of the invention.

Whatever the specific type of external display might be, the display shows, to nearby ORUs, a textual message, one or more icons, or both, depending on the embodiment. In some embodiments, the textual message is a warning or notification to ORUs that connected vehicle 100 is in gaming mode. An example of such a warning is illustrated in FIG. 3A. In FIG. 3A, connected vehicle 100 includes a transparent display 310 implemented in a side window of the vehicle. In this example, the cautionary text reads, "Caution: Vehicle in Gaming Mode." Such a warning alerts ORUs that connected vehicle 100 might exhibit unexpected behavior, such as platooning closely with one or more other vehicles that are engaged in a multi-vehicle networked game with the ego connected vehicle 100. Other examples of unexpected behavior include, without limitation, sudden or frequent lane changes, sudden U-turns, and frequent stops on the side of the roadway. In other embodiments, the warning is graphical (e.g., one or more icons) rather than textual. An example of such an icon-based warning is illustrated in FIG. 3B. In FIG. 3B, an icon 330 representing a gaming controller is used to signify to ORUs that connected vehicle 100 is in gaming mode. Whether the warning/notification is textual or graphical, putting ORUs on notice that connected vehicle 100 might exhibit unusual driving behavior can improve roadway safety.

Figure 4A:
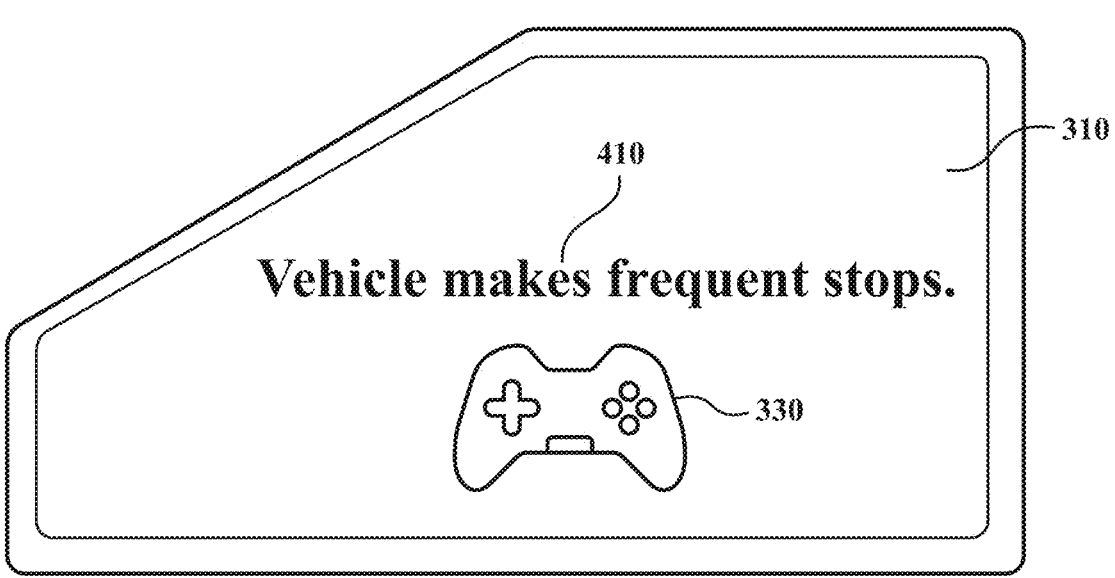
FIG. 4A illustrates a HMI indicator informing ORUs that a connected vehicle in gaming mode may exhibit unusual behavior, in accordance with an illustrative embodiment of the invention.

In some embodiments, the textual message displayed is more specific regarding the potential unexpected behavior by connected vehicle 100. An example of such a warning is illustrated in FIG. 4A. In FIG. 4A, the textual warning reads, "Vehicle makes frequent stops." This warning could refer, for example, to one or more occupants of connected vehicle 100 (and possibly occupants of other networked connected vehicles 100) being engaged in a scavenger hunt in which connected vehicle 100 frequently pulls over to the side of the roadway and stops. In the example of FIG. 4A, the presence, on the transparent display 310, of the icon 330 representing a gaming controller provides context for the textual warning, signifying to ORUs that connected vehicle 100 is in gaming mode.

In some embodiments, the external HMI indicators 245 include one or more lights that are mounted on the exterior of a connected vehicle 100. The way in which lights are used to communicate gaming-mode-related information to ORUs varies, depending on the embodiment. In some embodiments, a plurality of lights of the same or different colors are disposed along a light bar that is mounted to the roof, side, front, or back of the connected vehicle 100. In other embodiments, one or more discrete lights of the same or different colors are located in close proximity to one another or spread out in a predetermined pattern on the exterior of connected vehicle 100. In one embodiment, the lights are underglow lights mounted on the underside of the exterior of the connected vehicle 100. This embodiment is particularly useful in nighttime conditions.

In the various embodiments employing one or more lights, the lights can be arranged and activated in a manner that communicates to nearby ORUs that connected vehicle 100 is in gaming mode. The lights can also communicate, to ORUs, other secondary information pertaining to the gaming mode of the connected vehicle 100. Examples of some of the kinds of information that can be communicated are discussed further below. To communicate certain kinds of information, a given light among the one or more lights can be blinking (emphasizing the time the light is turned off) or flashing (emphasizing the time the light is turned on). In general, the one or more lights can be activated in accordance with a predetermined pattern that contributes to conveying the information pertaining to the gaming mode of the connected vehicle 100. Such a pattern can be temporal (e.g., a particular sequence of flashing or blinking lights of one or more particular colors), or the pattern can be spatial (e.g., lights arranged in a pattern that looks similar to the game-controller icon 330 shown in FIG. 3B).

In still other embodiments, the external HMI indicators 245 include one or more predetermined colors of a coating on the exterior of the connected vehicle 100 that can be controlled electronically. For example, in one embodiment connected vehicle 100 is coated with a substance such as e-Ink®, a substance containing millions of tiny microcapsules whose pigments change when electricity is applied. More generically, such a coating or film is referred to in the literature as an "electrophoretic" coating or film. In one embodiment, indicator activation module 220 causes the electrophoretic coating to change to a particular predetermined color that ORUs, through industry standardization and prior information, associate with the connected vehicle 100 being in gaming mode. In other embodiments, a combination of predetermined colors (e.g., in a distinctive, recognizable pattern) is used to indicate that the connected vehicle 100 is in gaming mode.

In some embodiments deploying a color-changeable electrophoretic coating, indicator activation module 220 includes additional machine-readable instructions that, when executed by the one or more processors 205, cause the one or more processors 205 to detect, via sensors (e.g., camera(s) 126) in the sensor system 120 of the connected vehicle 100, a set of predominant colors in the environment surrounding the connected vehicle 100 and to select one or more colors for the electrophoretic coating that contrast with the detected set of predominant colors. This increases the likelihood that ORUs notice the external HMI indicators 245 (the one or more colors of the electrophoretic coating). A similar approach can be applied to the selection of the color(s) of lights, where the external HMI indicators 245 include one or more lights, or the section of the color(s) of text and/or graphics, where the external HMI indicators 245 include an external display.

In some embodiments, the external HMI indicators 245 are dependent on the time of day. For example, different external HMI indicators 245 might be used in the daytime than in the nighttime. More specifically, lights might be favored over other kinds of external HMI indicators 245 at night because of their greater visibility.

In some embodiments, the external HMI indicators 245 vary with time in accordance with what is happening in the electronic game in which occupants of the connected vehicle 100 are participating. For example, in one embodiment the external HMI indicators 245 vary in accordance with the "cognitive load" of the one or more occupants of the connected vehicle 100 as the one or more occupants play a game. The active parts of a game (e.g., those requiring a player to actuate game controls) are generally associated with a higher cognitive load for the players, and the more passive parts of the game (e.g., listening segments) are generally associated with a lower cognitive load. This variability in cognitive load can be communicated in any of a variety of different ways, such as a change in light color, the number of lights illuminated, flashing/blinking light patterns, a variation in the color(s) of an electrophoretic coating of connected vehicle 100, updated information on an external display, etc.

In some embodiments, the external HMI indicators 245 communicate, to ORUs or game players in other participating connected vehicles 100, various aspects of game status. Examples include, without limitation, players who are (thus far) winning the game, players who are (thus far) losing the game, comparative standings (e.g., scores) of players in a connected vehicle 100, the number of players in the connected vehicle 100, the stage of the game (e.g., the level currently being played or the time remaining in the game), and whether or not the driver of the connected vehicle 100 is playing the game, where driver participation is possible and permitted.

Figure 4B:
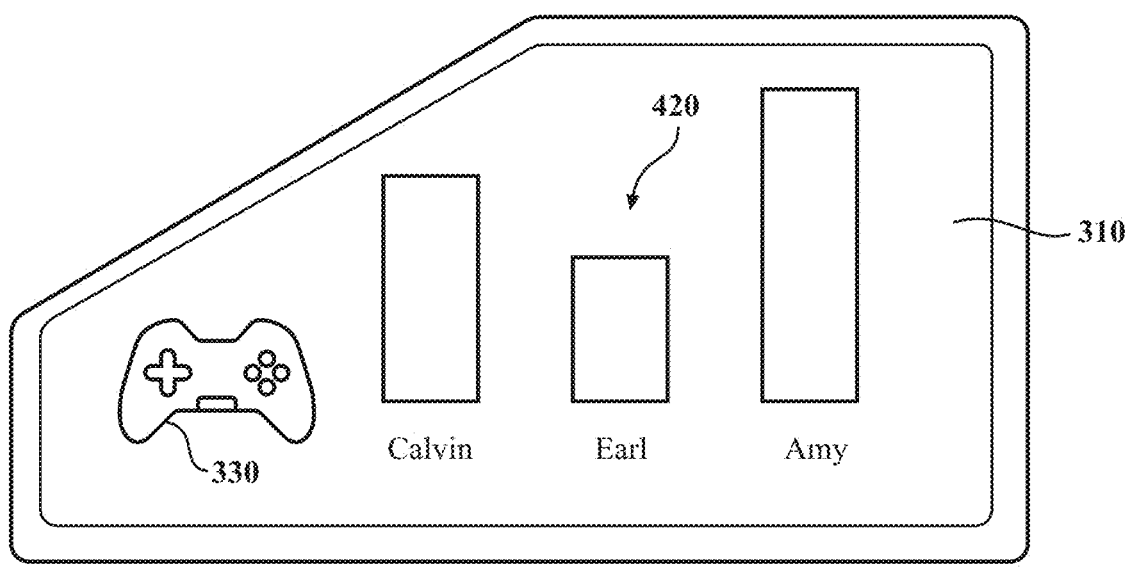
FIG. 4B illustrates comparative game standings for players in a connected vehicle that are displayed to ORUs, in accordance with an illustrative embodiment of the invention.

An example of displayed comparative standings is shown in FIG. 4B, an embodiment in which the information associated with the external HMI indicators 245 is communicated via a transparent display 310, as discussed above. In FIG. 4B, three occupants of a connected vehicle 100 are playing an electronic game. Their comparative game standings 420 (e.g., scores) are represented as bars in a bar graph. The icon 330 representing a gaming controller provides context (i.e., vehicular gaming) for the displayed standings.

In some embodiments, the external HMI indicators 245 can be used to convey information regarding the association with one another of vehicles engaged in multi-vehicle networked gaming. For example, in one embodiment the external HMI indicators 245 identify that occupants of an ego connected vehicle 100 and those of one or more other connected vehicles 100 are engaged together in multi-vehicle networked electronic gaming through the one or more external HMI indicators 245 of the ego connected vehicle 100 matching corresponding external HMI indicators on the one or more other connected vehicles 100. In other words, the ego connected vehicle 100 and the one or more other connected vehicles 100 have external HMI indicators 245 that look the same or substantially similar to one another. Such matching external HMI indicators 245 are coordinated by the respective indicator activation modules 220 in the participating connected vehicles 100. The matching external HMI indicators 245 of the participating vehicles alert ORUs that the group of vehicles is participating in multi-vehicle networked gaming. This can improve safety. For example, the driver of a vehicle in the left lane has a freeway exit coming up and notices that a group of vehicles ahead are engaged in a game based on their matching external HMI indicators 245. That driver might choose to get in the right lane sooner than he or she otherwise would have because of the platooned gaming connected vehicles 100 ahead and the desire not to get in the middle of such a group shortly before the driver needs to exit.

In another example, two gaming connected vehicles 100 stopped on the side of the road (e.g., to take pictures or look for a scavenger-hunt item) could be mistaken for stranded vehicles (or a stranded vehicle and another vehicle whose occupant(s) stopped to render assistance). The matching external HMI indicators 245 on the two stopped connected vehicles 100 inform ORUs that the vehicles are not in distress and that they are instead engaged in gaming. This reduces rubbernecking and prevents other drivers from needlessly stopping to assist the stopped vehicles. The same advantages apply to a single stopped vehicle. ORUs passing by can determine immediately, due to the external HMI indicators 245 on the stopped vehicle, that the stopped vehicle is involved in gaming instead of experiencing a mechanical breakdown.

In some embodiments, a multi-vehicle networked gaming activity involves two or more groups of vehicles competing against one another as teams. In such an embodiment, the external HMI indicators 245 of the connected vehicles 100 in each group (i.e., each team) of vehicles match (look the same or substantially similar to one another), and the external HMI indicators 245 of the connected vehicles 100 on different teams are different and readily distinguishable from one another. This permits ORUs to determine, at a glance, which vehicles are on which teams (e.g., to differentiate an ego connected vehicle 100 and one or more other connected vehicles 100 playing on "Team A" from another group of vehicles playing on "Team B" against "Team A"). This helps ORUs to predict which nearby vehicles are likely to behave like a platoon.

Figure 5A:
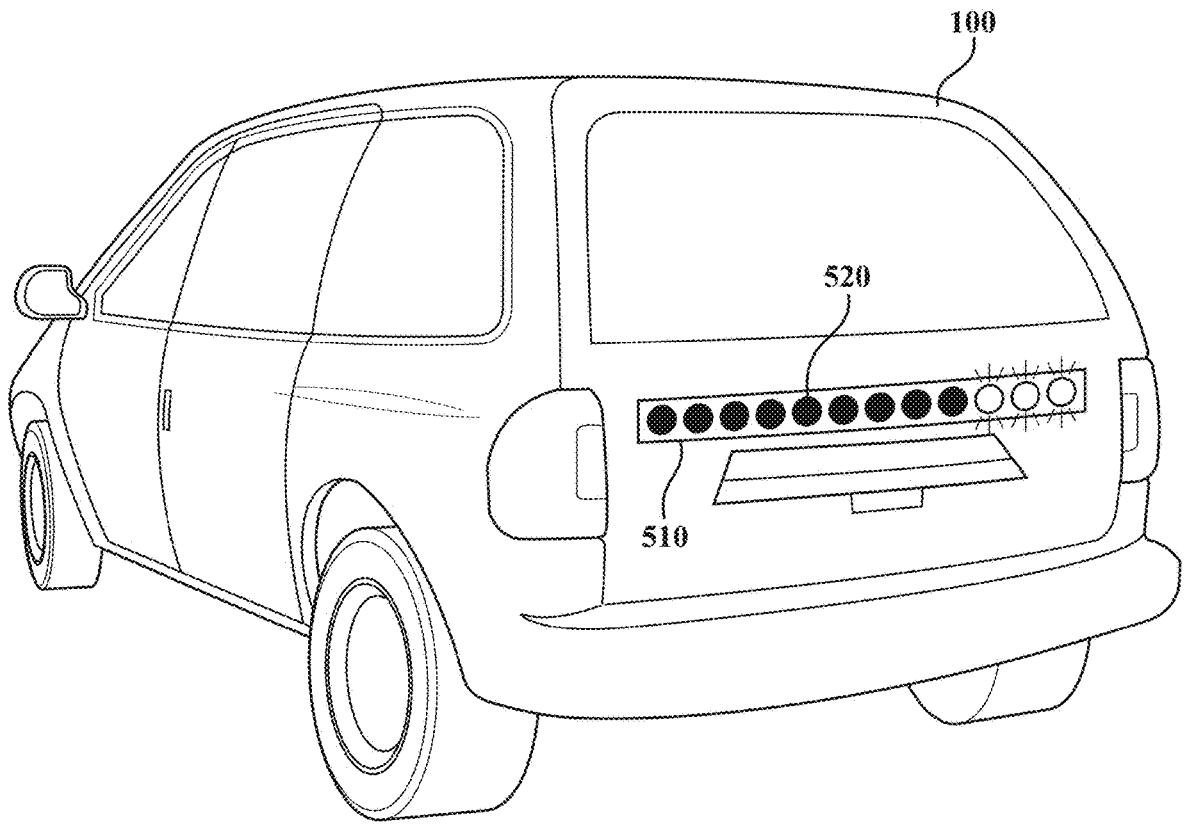
FIG. 5A illustrates a connected vehicle equipped with a light bar that communicates, to ORUs, an invitation to join an electronic game already in progress, in accordance with an illustrative embodiment of the invention.

In still other embodiments, the external HMI indicators 245 can be used to communicate, to ORUs (particularly the occupants of other nearby vehicles), an invitation to join an electronic game that is already in progress. In some embodiments, the external HMI indicators 245 include an indication of how many open slots for additional players are available. An example of such an embodiment is illustrated in FIG. 5A. In FIG. 5A, a connected vehicle 100 is equipped with a light bar 510 that houses a plurality of lights 520. In this embodiment, the nine activated (solidly lighted) lights 520 on the left side of light bar 510 indicate that nine of twelve total slots for players in a multi-vehicle networked game are already filled. The three remaining lights 520 (of a different color, in some variations) are flashing to indicate to ORUs in nearby vehicles that up to three additional players can join the game, if they desire. Networked communication among the respective gaming systems 150 and gaming-status communication systems 175 of the connected vehicles 100 enables vehicle occupants to participate in multi-vehicle networked gaming.

In some embodiments, indicator activation module 220 includes additional machine-readable instructions that, when executed by the one or more processors 205, cause the one or more processors 205 to provide, on a display (e.g., a center-console display) in the passenger compartment of a connected vehicle 100, information pertaining to the gaming mode of another connected vehicle 100 (i.e., a connected vehicle 100 other than the ego connected vehicle 100). Depending on the embodiment, the information provided can include (1) an icon representing the other connected vehicle 100, the icon including a characteristic that identifies the other connected vehicle 100 as being in gaming mode; (2) an estimate of how long the other connected vehicle 100 will remain engaged in gaming mode; or (3) both.

Figures 5B, 6:
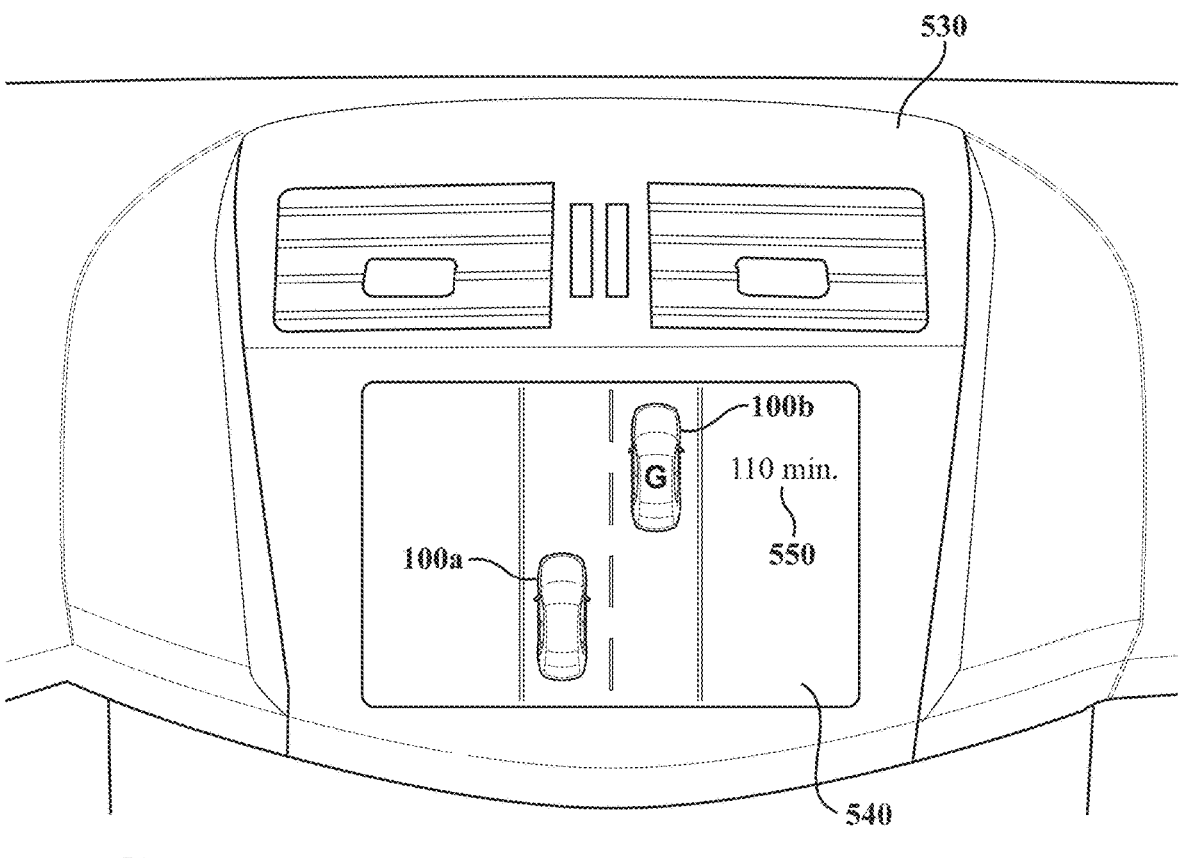
FIG. 5B illustrates a center-console display of a connected vehicle on which information pertaining to the gaming mode of another nearby connected vehicle is displayed, in accordance with an illustrative embodiment of the invention.
FIG. 6 is a flowchart of a method of externally communicating vehicular gaming status, in accordance with an illustrative embodiment of the invention.

An example of this embodiment is illustrated in FIG. 5B. In FIG. 5B, an ego connected vehicle 100a is traveling along a roadway, and another connected vehicle 100b is traveling nearby in an adjacent lane to the right of the ego connected vehicle 100a. A center-console display 540 in dashboard 530 of the ego connected vehicle 100a displays the two vehicles in their detected spatial relationship, as shown in FIG. 5B. The connected vehicle 100b is marked with a "G," in this embodiment, to indicate that connected vehicle 100b is in gaming mode. In other embodiments, an icon of a distinctive predetermined color can be used to indicate that connected vehicle 100b is in gaming mode. Further, gaming-duration indicator 550 indicates that connected vehicle 100b is predicted to remain engaged in gaming mode for another 110 minutes. This information and reciprocal information about the gaming status of ego connected vehicle 100a displayed in the passenger compartment of connected vehicle 100b can assist the occupants of the two vehicles in deciding whether to participate together in a multi-vehicle networked electronic game. For example, if the gaming-duration indicator 550 were to read, "25 min." instead of "110 min.," the occupants of the ego connected vehicle 100a might be less inclined to initiate participating in gaming with the occupants of connected vehicle 100b.

Referring once again to FIG. 2, adjustment module 225 generally includes machine-readable instructions that, when executed by the one or more processors 205, cause the one or more processors 205 to adjust automatically the settings of the ADAS 170 of the connected vehicle 100 when the connected vehicle 100 is engaged in multi-vehicle networked electronic gaming to support more effective platooning (e.g., driving in a close formation or stopping frequently) of the connected vehicle 100 with one or more other connected vehicles 100. For example, in one embodiment, adjustment module 225 includes further instructions that, when executed by the one or more processors 205, cause the one or more processors 205 to reduce the predetermined allowable minimum following distance of the ACC system in the connected vehicle 100. This permits a group of connected vehicles 100 participating together in a game such as a mystery tour or scavenger hunt to maintain a closer following distance from one another than is typical to facilitate playing of the game and to make it more difficult for other vehicles on the roadway to "cut in" between a pair of gaming vehicles in the platoon. This improves both the gaming experience for the participating vehicle occupants and the safety of any nearby ORUs.

FIG. 6 is a flowchart of a method 600 of externally communicating vehicular gaming status, in accordance with an illustrative embodiment of the invention. Method 600 will be discussed from the perspective of gaming-status communication system 175 in FIG. 2. While method 600 is discussed in combination with gaming-status communication system 175, it should be appreciated that method 600 is not limited to being implemented within gaming-status communication system 175, but gaming-status communication system 175 is instead one example of a system that may implement method 600.

At block 610, detection module 215 detects automatically, in a connected vehicle 100, activation of a gaming mode of the connected vehicle 100 in which the gaming system 150 of the connected vehicle 100 supports at least one of (1) electronic game playing by one or more occupants of the connected vehicle 100 and (2) multi-vehicle networked electronic gaming involving the connected vehicle 100 and one or more other connected vehicles 100. In some embodiments, gaming-status communication system 175 receives a notification from gaming system 150 that gaming system 150 has been activated (i.e., that connected vehicle 100 has entered "gaming mode").

At block 620, indicator activation module 220 activates automatically one or more external HMI indicators 245 on the exterior of the connected vehicle 100 to communicate, to ORUs, information pertaining to the gaming mode of the connected vehicle 100. As discussed above, two categories of external HMI indicators are (1) those that improve roadway safety and (2) those that facilitate vehicular gaming for participants in various ways. Examples of both categories of external HMI indicators 245 are discussed above, and some of those examples are illustrated and discussed in greater detail above in connection with FIGS. 3A-5B. As also discussed above, the external HMI indicators 245 can be implemented in a variety of different ways, depending on the embodiment.

In some embodiments, method 600 includes additional actions. For example, in some embodiments, method 600 further includes adjustment module 225 adjusting automatically the settings of the ADAS 170 of the connected vehicle 100 when the connected vehicle 100 is engaged in multi-vehicle networked electronic gaming to support more effective platooning (e.g., driving in a close formation or stopping frequently) of the connected vehicle 100 with one or more other connected vehicles 100. For example, in one embodiment, adjustment module 225 includes further instructions that, when executed by the one or more processors 205, cause the one or more processors 205 to reduce the predetermined allowable minimum following distance of the ACC system in the connected vehicle 100. This permits a group of connected vehicles 100 participating together in a game such as a mystery tour or scavenger hunt to maintain a closer following distance from one another than is typical to facilitate playing of the game and to make it more difficult for other vehicles on the roadway to "cut in" between a pair of gaming vehicles in the platoon. This improves both the gaming experience for the participating vehicle occupants and the safety of any nearby ORUs.

As discussed above, the various kinds of external HMI indicators 245 disclosed herein can improve roadway safety by making ORUs aware that a connected vehicle 100 is in gaming mode, and the external HMI indicators 245 can also provide various kinds of secondary gaming-related information to ORUs to facilitate vehicular electronic gaming, including multi-vehicle networked gaming.

FIG. 1 will now be discussed in full detail as an example vehicle environment within which the systems and methods disclosed herein may be implemented. In some instances, the connected vehicle 100 can be configured to switch selectively between an automated mode, one or more semi-automated operational modes, and/or a manual mode. Such switching, also referred to as handover when transitioning to a manual mode, can be implemented in a suitable manner, now known or later developed. "Manual mode" means that all of or a majority of the navigation and/or maneuvering of the vehicle is performed according to inputs received from a user (e.g., human driver/operator).

In one or more implementations, the connected vehicle 100 can be an automated vehicle. As used herein, "automated vehicle" refers to a vehicle that operates in an automated mode. "Automated mode" refers to navigating and/or maneuvering a vehicle along a travel route using one or more computing devices to control the vehicle with minimal or no input from a human driver/operator. In one implementation, the connected vehicle 100 is configured with one or more semi-automated operational modes in which one or more computing devices perform a portion of the navigation and/or maneuvering of the vehicle along a travel route, and a vehicle operator (i.e., driver) provides inputs to the vehicle to perform a portion of the navigation and/or maneuvering of the connected vehicle 100 along a travel route. Thus, in one or more implementations, the connected vehicle 100 operates autonomously according to a particular defined level of autonomy.

The connected vehicle 100 can include one or more processors 110. In one or more arrangements, the one or more processors 110 can be a main processor of the connected vehicle 100. For instance, the one or more processors 110 can be an electronic control unit (ECU). The connected vehicle 100 can include one or more data stores 115 for storing one or more types of data. The data store(s) 115 can include volatile and/or non-volatile memory. Examples of suitable data stores 115 include RAM, flash memory, ROM, PROM (Programmable Read-Only Memory), EPROM, EEPROM (Electrically Erasable Programmable Read-Only Memory), registers, magnetic disks, optical disks, hard drives, or any other suitable storage medium, or any combination thereof. The data store(s) 115 can be a component(s) of the one or more processors 110, or the data store(s) 115 can be operatively connected to the one or more processors 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangement, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangement, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the connected vehicle 100 is equipped with, including the capabilities and other information about such sensors. As will be explained below, the connected vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the connected vehicle 100. Alternatively, or in addition, at least a portion of the map data 116 and/or the sensor data 119 can be located in one or more data stores 115 that are located remotely from the connected vehicle 100.

As noted above, the connected vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can function independently from each other. Alternatively, two or more of the sensors can work in combination with each other. In such a case, the two or more sensors can form a sensor network. The sensor system 120 and/or the one or more sensors can be operatively connected to the one or more processors 110, the data store(s) 115, and/or another element of the connected vehicle 100 (including any of the elements shown in FIG. 1).

The sensor system 120 can include any suitable type of sensor. Various examples of different types of sensors will be described herein. However, it will be understood that the implementations are not limited to the particular sensors described. The sensor system 120 can include one or more vehicle sensors 121. The vehicle sensors 121 can detect, determine, and/or sense information about the connected vehicle 100 itself, including the operational status of various vehicle components and systems.

In one or more arrangements, the vehicle sensors 121 can be configured to detect, and/or sense position and/or orientation changes of the connected vehicle 100, such as, for example, based on inertial acceleration. In one or more arrangements, the vehicle sensors 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensors 121 can be configured to detect, and/or sense one or more characteristics of the connected vehicle 100. In one or more arrangements, the vehicle sensors 121 can include a speedometer to determine a current speed of the connected vehicle 100.

Alternatively, or in addition, the sensor system 120 can include one or more environment sensors 122 configured to acquire, and/or sense driving environment data. "Driving environment data" includes any data or information about the external environment in which a vehicle is located or one or more portions thereof. For example, the one or more environment sensors 122 can be configured to detect, quantify, and/or sense obstacles in at least a portion of the external environment of the connected vehicle 100 and/or information/data about such obstacles. The one or more environment sensors 122 can be configured to detect, measure, quantify, and/or sense other things in at least a portion the external environment of the connected vehicle 100, such as, for example, nearby vehicles, lane markers, signs, traffic lights, traffic signs, lane lines, crosswalks, curbs proximate the connected vehicle 100, off-road objects, etc.

Various examples of sensors of the sensor system 120 are discussed above. The example sensors may be part of the one or more environment sensors 122 and/or the one or more vehicle sensors 121. Moreover, the sensor system 120 can include operator sensors that function to track or otherwise monitor aspects related to the driver/operator of the connected vehicle 100. However, it will be understood that the implementations are not limited to the particular sensors described. As an example, in one or more arrangements, the sensor system 120 can include one or more radar sensors 123, one or more LIDAR sensors 124, one or more sonar sensors 125, and/or one or more cameras 126.

The connected vehicle 100 can further include a communication system 130. The communication system 130 can include one or more components configured to facilitate communication between the connected vehicle 100 and one or more communication sources. Communication sources, as used herein, refers to people or devices with which the connected vehicle 100 can communicate with, such as external networks, computing devices, operator or occupants of the connected vehicle 100, or others. As part of the communication system 130, the connected vehicle 100 can include an input system 131. An "input system" includes any device, component, system, element or arrangement or groups thereof that enable information/data to be entered into a machine. In one or more examples, the input system 131 can receive an input from a vehicle occupant (e.g., a driver or a passenger). The connected vehicle 100 can include an output system 132. An "output system" includes any device, component, or arrangement or groups thereof that enable information/data to be presented to the one or more communication sources (e.g., a person, a vehicle passenger, etc.). The communication system 130 can further include specific elements which are part of or can interact with the input system 131 or the output system 132, such as one or more display device(s) 133, and one or more audio device(s) 134 (e.g., speakers and microphones).

The connected vehicle 100 can include one or more vehicle systems 140. Various examples of the one or more vehicle systems 140 are shown in FIG. 1. However, the connected vehicle 100 can include more, fewer, or different vehicle systems. It should be appreciated that although particular vehicle systems are separately defined, each or any of the systems or portions thereof may be otherwise combined or segregated via hardware and/or software within the connected vehicle 100. The connected vehicle 100 can include a propulsion system 141, a braking system 142, a steering system 143, throttle system 144, a transmission system 145, a signaling system 146, and/or a navigation system 147. Each of these systems can include one or more devices, components, and/or combinations thereof, now known or later developed.

The one or more processors 110 and/or the automated driving module(s) 160 can be operatively connected to communicate with the various vehicle systems 140 and/or individual components thereof. For example, returning to FIG. 1, the one or more processors 110 and/or the automated driving module(s) 160 can be in communication to send and/or receive information from the various vehicle systems 140 to control the movement, speed, maneuvering, heading, direction, etc. of the connected vehicle 100. The one or more processors 110 and/or the automated driving module(s) 160 may control some or all of these vehicle systems 140 and, thus, may be partially or fully automated.

The connected vehicle 100 can include one or more modules, at least some of which are described herein. The modules can be implemented as computer-readable program code that, when executed by a processor 110, implement one or more of the various processes described herein. The processor 110 can be a device, such as a CPU, which is capable of receiving and executing one or more threads of instructions for the purpose of performing a task. One or more of the modules can be a component of the one or more processors 110, or one or more of the modules can be executed on and/or distributed among other processing systems to which the one or more processors 110 is operatively connected. The modules can include instructions (e.g., program logic) executable by one or more processors 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

In some implementations, the connected vehicle 100 can include one or more automated driving modules 160. The automated driving module(s) 160 can be configured to receive data from the sensor system 120 and/or any other type of system capable of capturing information relating to the connected vehicle 100 and/or the external environment of the connected vehicle 100. In one or more arrangements, the automated driving module(s) 160 can use such data to generate one or more driving scene models. The automated driving module(s) 160 can determine the position and velocity of the connected vehicle 100. The automated driving module(s) 160 can determine the location of obstacles, or other environmental features including traffic signs, trees, shrubs, neighboring vehicles, pedestrians, etc.

The automated driving module(s) 160 can be configured to determine travel path(s), current automated driving maneuvers for the connected vehicle 100, future automated driving maneuvers and/or modifications to current automated driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the connected vehicle 100, changing travel lanes, merging into a travel lane, and/or reversing, just to name a few possibilities. The automated driving module(s) 160 can be configured can be configured to implement determined driving maneuvers. The automated driving module(s) 160 can cause, directly or indirectly, such automated driving maneuvers to be implemented. As used herein, "cause" or "causing" means to make, command, instruct, and/or enable an event or action to occur or at least be in a state where such event or action may occur, either in a direct or indirect manner. The automated driving module(s) 160 can be configured to execute various vehicle functions and/or to transmit data to, receive data from, interact with, and/or control the connected vehicle 100 or one or more systems thereof (e.g., one or more of vehicle systems 140). The noted functions and methods will become more apparent with a further discussion of the figures.

Detailed implementations are disclosed herein. However, it is to be understood that the disclosed implementations are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various implementations are shown in FIGS. 1-6, but the implementations are not limited to the illustrated structure or application.

The flowcharts and block diagrams in the figures illustrate the architecture, functionality, and operation of possible implementations of systems, methods, and computer program products according to various implementations. In this regard, each block in the flowcharts or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession can be executed substantially concurrently, or the blocks can sometimes be executed in the reverse order, depending upon the functionality involved.

The systems, components and/or methods described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or methods also can be embedded in a computer-readable storage, such as a computer program product or other data programs storage device, readable by a machine, tangibly embodying a program of instructions executable by the machine to perform methods and methods described herein. These elements also can be embedded in an application product which comprises all the features enabling the implementation of the methods described herein and, which when loaded in a processing system, is able to carry out these methods.

Furthermore, arrangements described herein can take the form of a computer program product embodied in one or more computer-readable media having computer-readable program code embodied or embedded, such as stored thereon. Any combination of one or more computer-readable media can be utilized. The computer-readable medium can be a computer-readable signal medium or a computer-readable storage medium. The phrase "computer-readable storage medium" means a non-transitory storage medium. A computer-readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a RAM, a ROM, an EPROM or Flash memory, an optical fiber, a portable compact disc read-only memory (CD-ROM), a digital versatile disc (DVD), an optical storage device, a magnetic storage device, or any suitable combination of the foregoing. In the context of this document, a computer-readable storage medium can be any tangible medium that can contain, or store a program for use by, or in connection with, an instruction execution system, apparatus, or device.

Program code embodied on a computer-readable medium can be transmitted using any appropriate medium, including but not limited to wireless, wireline, optical fiber, cable, RF, etc., or any suitable combination of the foregoing. Computer program code for carrying out operations for aspects of the present arrangements can be written in any combination of one or more programming languages, including an object-oriented programming language such as Java™, Smalltalk, C++ or the like and conventional procedural programming languages, such as the "C" programming language or similar programming languages. The program code can execute entirely on the user's computer, partly on the user's computer, as a stand-alone software package, partly on the user's computer and partly on a remote computer, or entirely on the remote computer or server. In the latter scenario, the remote computer can be connected to the user's computer through any type of network, including a LAN or a WAN, or the connection can be made to an external computer (for example, through the Internet using an Internet Service Provider).

In the description above, certain specific details are outlined in order to provide a thorough understanding of various implementations. However, one skilled in the art will understand that the invention may be practiced without these details. In other instances, well-known structures have not been shown or described in detail to avoid unnecessarily obscuring descriptions of the implementations. Unless the context requires otherwise, throughout the specification and claims which follow, the word "comprise" and variations thereof, such as, "comprises" and "comprising" are to be construed in an open, inclusive sense, that is, as "including, but not limited to." Further, headings provided herein are for convenience only and do not interpret the scope or meaning of the claimed invention.

Reference throughout this specification to "one or more implementations" or "an implementation" means that a particular feature, structure or characteristic described in connection with the implementation is included in at least one or more implementations. Thus, the appearances of the phrases "in one or more implementations" or "in an implementation" in various places throughout this specification are not necessarily all referring to the same implementation. Furthermore, the particular features, structures, or characteristics may be combined in any suitable manner in one or more implementations. Also, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings (such as "Background" and "Summary") and sub-headings used herein are intended only for general organization of topics within the present disclosure and are not intended to limit the disclosure of the technology or any aspect thereof. The recitation of multiple implementations having stated features is not intended to exclude other implementations having additional features, or other implementations incorporating different combinations of the stated features. As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an implementation can or may comprise certain elements or features does not exclude other implementations of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an implementation or particular system is included in at least one or more implementations or aspect. The appearances of the phrase "in one aspect" (or variations thereof) are not necessarily referring to the same aspect or implementation. It should also be understood that the various method steps discussed herein do not have to be carried out in the same order as depicted, and not each method step is required in each aspect or implementation.

Generally, "module," as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions. The term "module," as used herein, is not intended, under any circumstances, to invoke interpretation of the appended claims under 35 U.S.C. § 112(f).

The terms "a" and "an," as used herein, are defined as one as or more than one. The term "plurality," as used herein, is defined as two or more than two. The term "another," as used herein, is defined as at least a second or more. The terms "including" and/or "having," as used herein, are defined as including (i.e., open language). The phrase "at least one of . . . and . . . " used herein refers to and encompasses any and all possible combinations of one or more of the associated listed items. As an example, the phrase "at least one of A, B and C" includes A only, B only, C only, or any combination thereof (e.g., AB, AC, BC or ABC).

The preceding description of the implementations has been provided for purposes of illustration and description. It is not intended to be exhaustive or to limit the disclosure. Individual elements or features of a particular implementation are generally not limited to that particular implementation, but, where applicable, are interchangeable and can be used in a selected implementation, even if not specifically shown or described. The same may also be varied in many ways. Such variations should not be regarded as a departure from the disclosure, and all such modifications are intended to be included within the scope of the disclosure.

While the preceding is directed to implementations of the disclosed devices, systems, and methods, other and further implementations of the disclosed devices, systems, and methods can be devised without departing from the basic scope thereof. The scope thereof is determined by the claims that follow.

What is claimed is:

1. A system for externally communicating vehicular gaming status, the system comprising:
a processor; and
a memory storing machine-readable instructions that, when executed by the processor, cause the processor to:
detect automatically, in a connected vehicle, activation of a gaming mode of the connected vehicle in which a gaming system of the connected vehicle supports at least one of (1) electronic game playing by one or more occupants of the connected vehicle and (2) multi-vehicle networked electronic gaming involving the connected vehicle and one or more other connected vehicles; and
activate automatically one or more external human-machine interface (HMI) indicators on an exterior of the connected vehicle to communicate, to other road users, information pertaining to the gaming mode of the connected vehicle, wherein the information conveys at least one of (1) a warning regarding unexpected behavior of the connected vehicle or (2) identification that the connected vehicle and the one or more other connected vehicles are engaged together in the multi-vehicle networked electronic gaming through the one or more external HMI indicators matching corresponding external HMI indicators on the one or more other connected vehicles.

2. The system of claim 1, wherein the one or more external HMI indicators include one or more of:
a display on the exterior of the connected vehicle showing at least one of a textual message and one or more icons;
one or more lights mounted on the exterior of the connected vehicle; or
one or more predetermined colors of a coating on the exterior of the connected vehicle, wherein the one or more predetermined colors are controlled electronically.

3. The system of claim 2, wherein the display is a transparent display implemented in a window of the connected vehicle.

4. The system of claim 2, wherein the one or more lights are one or more of:
disposed along a light bar;
underglow lights mounted on an underside of the exterior of the connected vehicle;
blinking;
flashing; or

20 activated in accordance with a predetermined pattern that contributes to conveying the information pertaining to the gaming mode of the connected vehicle.

5. The system of claim 1, wherein the one or more external HMI indicators are one or more of:
dependent on time of day;
selected to include one or more colors that contrast with a set of predominant colors detected in an environment surrounding the connected vehicle by sensors of the connected vehicle; or
variable with time in accordance with a cognitive load of the one or more occupants of the connected vehicle as the one or more occupants of the connected vehicle engage in the electronic game playing.

6. The system of claim 1, wherein the information pertaining to the gaming mode of the connected vehicle includes one or more of:
game status, wherein the game status includes one or more of players winning, players losing, comparative standings of players in the connected vehicle, number of players in the connected vehicle, stage of game, or whether a driver of the connected vehicle is playing;
identification that the connected vehicle and the one or more other connected vehicles are on a same team in a multi-team competitive electronic game through the one or more external HMI indicators matching corresponding external HMI indicators on the one or more other connected vehicles to differentiate the connected vehicle and the one or more other connected vehicles from one or more additional vehicular teams, each of whose connected vehicles have matching external HMI indicators different from the one or more external HMI indicators; or
an invitation to join a game that is already in progress, the invitation including an indication of how many open slots for additional players are available.

7. The system of claim 6, wherein the comparative standings of players in the connected vehicle are displayed on a transparent display implemented in a window of the connected vehicle.

8. The system of claim 1, wherein the machine-readable instructions include further instructions that, when executed by the processor, cause the processor to provide, on a display in a passenger compartment of the connected vehicle, information pertaining to a gaming mode of another connected vehicle, wherein the information pertaining to the gaming mode of the another connected vehicle includes at least one of:
an icon representing the another connected vehicle, the icon including a characteristic that identifies the another connected vehicle as being in the gaming mode of the another connected vehicle; or
an estimate of how long the another connected vehicle will remain in the gaming mode of the another connected vehicle.

9. The system of claim 1, wherein the machine-readable instructions include further instructions that, when executed by the processor, cause the processor to adjust automatically settings of an Advanced Driver-Assistance System (ADAS) of the connected vehicle when the connected vehicle is engaged in the multi-vehicle networked electronic gaming to support platooning of the connected vehicle with the one or more other connected vehicles.

10. The system of claim 9, wherein the further instructions that, when executed by the processor, cause the processor to adjust automatically settings of the ADAS of the connected vehicle include instructions to reduce a predetermined allowable minimum following distance of an adaptive cruise-control system in the connected vehicle.

11. A non-transitory computer-readable medium for externally communicating vehicular gaming status and storing instructions that, when executed by a processor, cause the processor to:

detect automatically, in a connected vehicle, activation of a gaming mode of the connected vehicle in which a gaming system of the connected vehicle supports at least one of (1) electronic game playing by one or more occupants of the connected vehicle and (2) multi-vehicle networked electronic gaming involving the connected vehicle and one or more other connected vehicles; and activate automatically one or more external human-machine interface (HMI) indicators on an exterior of the connected vehicle to communicate, to other road users, information pertaining to the gaming mode of the connected vehicle, wherein the information conveys at least one of (1) a warning regarding unexpected behavior of the connected vehicle or (2) identification that the connected vehicle and the one or more other connected vehicles are engaged together in the multi-vehicle networked electronic gaming through the one or more external HMI indicators matching corresponding external HMI indicators on the one or more other connected vehicles.

12. The non-transitory computer-readable medium of claim 11, wherein the one or more external HMI indicators include one or more of:

a display on the exterior of the connected vehicle showing at least one of a textual message and one or more icons;

one or more lights mounted on the exterior of the connected vehicle; or one or more predetermined colors of a coating on the exterior of the connected vehicle, wherein the one or more predetermined colors are controlled electronically.

13. The non-transitory computer-readable medium of claim 12, wherein the display is a transparent display implemented in a window of the connected vehicle.

14. The non-transitory computer-readable medium of claim 12, wherein the one or more lights are one or more of:

disposed along a light bar;

underglow lights mounted on an underside of the exterior of the connected vehicle;

blinking;

flashing; or activated in accordance with a predetermined pattern that contributes to conveying the information pertaining to the gaming mode of the connected vehicle.

15. The non-transitory computer-readable medium of claim 11, wherein the one or more external HMI indicators are one or more of:

dependent on time of day;

selected to include one or more colors that contrast with a set of predominant colors detected in an environment surrounding the connected vehicle by sensors of the connected vehicle; or variable with time in accordance with a cognitive load of the one or more occupants of the connected vehicle as the one or more occupants of the connected vehicle engage in the electronic game playing.

16. A method, comprising:

detecting automatically, in a connected vehicle, activation of a gaming mode of the connected vehicle in which a gaming system of the connected vehicle supports at least one of (1) electronic game playing by one or more occupants of the connected vehicle and (2) multi-vehicle networked electronic gaming involving the connected vehicle and one or more other connected vehicles; and activating automatically one or more external human-machine interface (HMI) indicators on an exterior of the connected vehicle to communicate, to other road users, information pertaining to the gaming mode of the connected vehicle, wherein the information conveys at least one of (1) a warning regarding unexpected behavior of the connected vehicle or (2) identification that the connected vehicle and the one or more other connected vehicles are engaged together in the multi-vehicle networked electronic gaming through the one or more external HMI indicators matching corresponding external HMI indicators on the one or more other connected vehicles.

17. The method of claim 16, wherein the information pertaining to the gaming mode of the connected vehicle includes one or more of:

game status, wherein the game status includes one or more of players winning, players losing, comparative standings of players in the connected vehicle, number of players in the connected vehicle, stage of game, or whether a driver of the connected vehicle is playing;

identification that the connected vehicle and the one or more other connected vehicles are on a same team in a multi-team competitive electronic game through the one or more external HMI indicators matching corresponding external HMI indicators on the one or more other connected vehicles to differentiate the connected vehicle and the one or more other connected vehicles from one or more additional vehicular teams, each of whose connected vehicles have matching external HMI indicators different from the one or more external HMI indicators; or an invitation to join a game that is already in progress, the invitation including an indication of how many open slots for additional players are available.

18. The method of claim 16, further comprising providing, on a display in a passenger compartment of the connected vehicle, information pertaining to a gaming mode of another connected vehicle, wherein the information pertaining to the gaming mode of the another connected vehicle includes at least one of:

an icon representing the another connected vehicle, the icon including a characteristic that identifies the another connected vehicle as being in the gaming mode of the another connected vehicle; or an estimate of how long the another connected vehicle will remain in the gaming mode of the another connected vehicle.

19. The method of claim 16, further comprising automatically adjusting settings of an Advanced Driver-Assistance System (ADAS) of the connected vehicle when the connected vehicle is engaged in the multi-vehicle networked electronic gaming to support platooning of the connected vehicle with the one or more other connected vehicles.

20. The method of claim 19, wherein the automatically adjusting the settings of the ADAS includes reducing a predetermined allowable minimum following distance of an adaptive cruise-control system in the connected vehicle.

* * * * *